O. D. JOHNSON & J. F. BRACKET.
ROTARY STALK-CUTTER.

No. 185,931. Patented Jan. 2, 1877.

WITNESSES:
H. Rydquist
John Goethals

INVENTOR:
O. D. Johnson
BY J. F. Bracket
ATTORNEYS.

N. PETERS, PHOTO-LITHOGRAPHER, WASHINGTON, D. C.

UNITED STATES PATENT OFFICE.

ORSON D. JOHNSON AND JOHN F. BRACKET, OF MOUNT PULASKI, ILLINOIS, ASSIGNORS TO THEMSELVES AND C. C. MASON, OF SAME PLACE.

IMPROVEMENT IN ROTARY STALK-CUTTERS.

Specification forming part of Letters Patent No. 185,931, dated January 2, 1877; application filed July 15, 1876.

*To all whom it may concern:*

Figure 1:
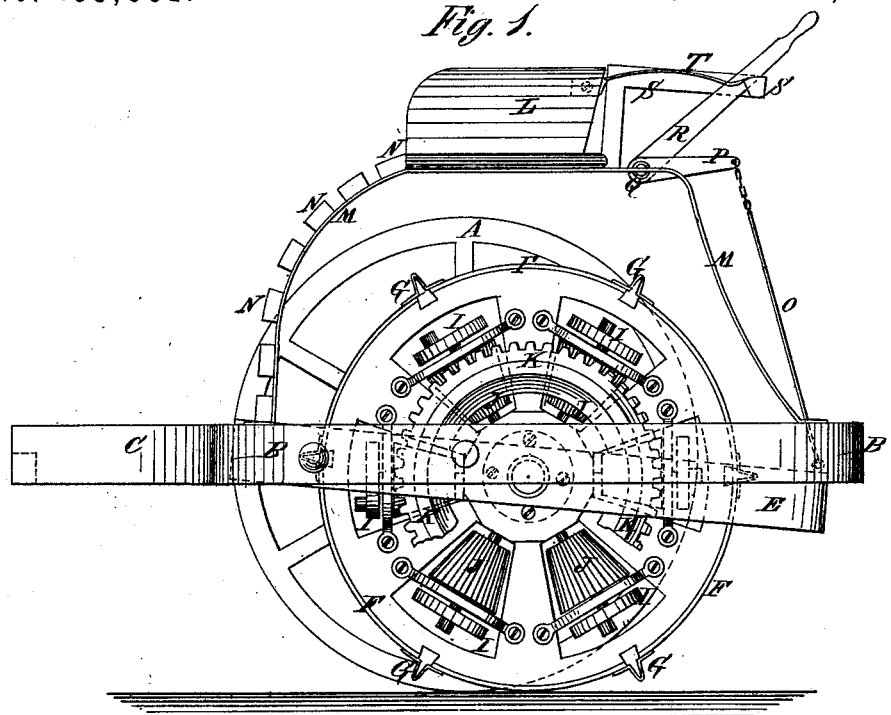
Figure 2:
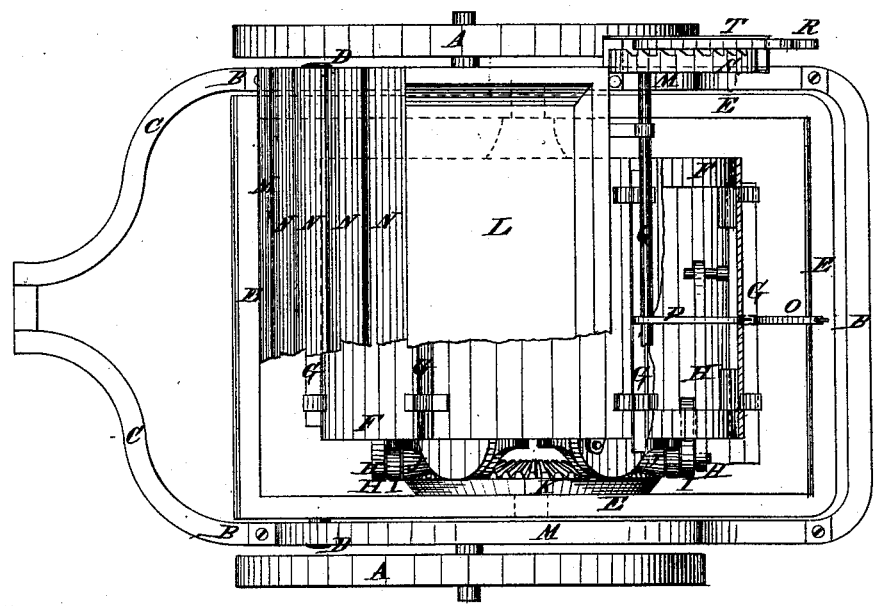

Be it known that we, ORSON D. JOHNSON and JOHN F. BRACKET, of Mount Pulaski, in the county of Logan and State of Illinois, have invented a new and useful Improvement in Rotary Stalk-Cutter, of which the following is a specification:

Figure 1 is a side view of our improved machine. Fig. 2 is a top view of the same, parts being broken away to show the construction.

Similar letters of reference indicate corresponding parts.

The object of this invention is to furnish an improved machine for cutting stalks into pieces, so that they may be plowed under to fertilize the soil, and may not impede the operation of plowing.

The invention consists in the combination of the pivoted frame, the drum, the vibrating knives, the connecting-bars, the cranks or crank-wheels, the bevel-gear wheels, and the large stationary bevel-gear wheel with each other, and with the stationary frame and its wheels.

A are the wheels, which revolve upon short axles attached to the frame B. To the forward end of the frame B is attached the tongue C, by which the machine is drawn and guided. To the forward part of the side bars of the frame B are pivoted, by two pins, D, the forward parts of the side bars of the frame E, which is placed within the said frame B, and to the middle parts of the side bars of which are pivoted the journals of the drum or roller F. In the face of the drum F are formed six, more or less, slots, in which are placed knives or cutters, G, which slide longitudinally in said slots, and are kept in place by keepers attached to the drum F. To the middle parts of the inner edges of the knives, G, are pivoted the inner ends of the connecting-bars H, the outer ends of which are pivoted to cranks or crank-wheels I, attached to the outer journals of the bevel-gear wheels J. The outer journals of the bevel-gear wheels J revolve in brackets attached to the end of the drum F, and their inner journals revolve in bearings in the hub of said drum.

The teeth of all the bevel-gear wheels J mesh into the teeth of the large bevel-gear wheel K attached to the side bar of the frame E.

By this construction the knives G will be vibrated longitudinally by the revolution of the drum F, so as to more effectually cut off the stalks as they are pressed down by the said drum F.

L is the driver's seat, the supports M of which are attached to the front and rear parts of the side bars of the frame B.

To the front supports of the seat L are attached cross-bars N to keep the driver's legs and clothes away from the drum F, and protect the driver from pieces of stalks that may be carried over by the said drum.

To the rear cross-bar of the frame E is attached the lower end of a connecting-rod or chain, O, the upper end of which rod or chain O is attached to the outer end of the arm P, rigidly attached to the shaft Q.

The shaft Q works in bearings attached to the supports M of the driver's seat L, and to its end is rigidly attached a lever, R, which projects into such a position that it may be readily reached and operated by the driver from his seat.

The lever R moves along the notched or toothed bar S, by the teeth of which it is held in any position into which it may be adjusted. The lever R is kept in place by the guide-bar T attached to the said rack-bar S.

By this construction, by operating the lever R the drum F and its attachments may be raised from the ground to pass obstructions, and for convenience in passing from place to place.

Having thus described our invention, we claim as new and desire to secure by Letters Patent—

The combination of the pivoted frame E, the drum F, the vibrating knives G, the connecting-bars H, the cranks or crank-wheels I, the bevel-gear wheels J, and the large stationary bevel-gear wheel K, with each other and with the frame B, and the wheels A, substantially as herein shown and described.

ORSON D. JOHNSON.
JOHN F. BRACKET.

Witnesses:
R. E. TURLEY,
JACOB YAGER.